United States Patent
Ha et al.

(10) Patent No.: US 10,749,589 B2
(45) Date of Patent: Aug. 18, 2020

(54) APPARATUS AND METHOD FOR SELECTING BEAM IN WIRELESS COMMUNICATION SYSTEM

(71) Applicant: SAMSUNG ELECTRONICS CO., LTD., Suwon-si (KR)

(72) Inventors: Kilsik Ha, Suwon-si (KR); Daehoon Kim, Suwon-si (KR); Bongjin Kim, Suwon-si (KR); Taekyoung Kim, Suwon-si (KR); Jongho Oh, Suwon-si (KR); Hyoungjin Lim, Suwon-si (KR); Doyoung Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/263,692

(22) Filed: Jan. 31, 2019

(65) Prior Publication Data

US 2019/0245606 A1 Aug. 8, 2019

(30) Foreign Application Priority Data

Feb. 8, 2018 (KR) .................. 10-2018-0015900

(51) Int. Cl.
| | | |
|---|---|---|
| *H04K 1/10* | (2006.01) | |
| *H04L 27/28* | (2006.01) | |
| *H04B 7/06* | (2006.01) | |
| *H04B 17/382* | (2015.01) | |
| *H04B 17/318* | (2015.01) | |
| *H04B 7/08* | (2006.01) | |

(52) U.S. Cl.
CPC .......... *H04B 7/0695* (2013.01); *H04B 7/066* (2013.01); *H04B 7/088* (2013.01); *H04B 17/318* (2015.01); *H04B 17/382* (2015.01)

(58) Field of Classification Search
CPC .. H04B 7/0695; H04B 17/382; H04B 17/318; H04B 7/066; H04L 1/0001; H04W 72/042
USPC .......................... 375/260, 346; 370/329, 232
See application file for complete search history.

(56) References Cited

U.S. PATENT DOCUMENTS

| | | | |
|---|---|---|---|
| 7,231,183 B2 * | 6/2007 | Pauli .................... | H04L 1/0001 370/232 |
| 2013/0286960 A1 * | 10/2013 | Li ....................... | H04W 72/042 370/329 |
| 2017/0288763 A1 | 10/2017 | Yoo et al. | |

* cited by examiner

*Primary Examiner* — Phuong Phu
(74) *Attorney, Agent, or Firm* — Sughrue Mion, PLLC

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). The present disclosure relates to an apparatus and a method for wireless communication. The method may include: measuring beam pairs using signals transmitted from another apparatus using a plurality of carriers; determining a beam pair for the plurality of carriers based on measurement values for the beam pairs; and transmitting information indicating a transmit beam of the beam pair, to the other apparatus.

18 Claims, 16 Drawing Sheets

APPARATUS AND METHOD FOR SELECTING BEAM IN WIRELESS COMMUNICATION SYSTEM

CROSS-REFERENCE TO RELATED APPLICATION(S)

This application is based on and claims priority under 35 U.S.C. § 119 to Korean Patent Application No. 10-2018-0015900, filed on Feb. 8, 2018, in the Korean Intellectual Property Office, the disclosure of which is incorporated by reference herein in its entirety.

BACKGROUND

1. Field

The disclosure relates generally to a wireless communication system and, more particularly, to an apparatus and a method for selecting a beam in the wireless communication system.

2. Description of Related Art

To meet the demand for wireless data traffic having increased since the deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System.'

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

For beamforming in the 5G system, an adequate beam needs to be selected. Since the beam has directivity, the adequate beam may vary according to relative positions of a terminal and a base station, or an obstacle. If an inadequate beam is selected, beamforming gain is not provided and communication quality may be degraded.

SUMMARY

Provided are an apparatus and a method for effectively selecting a beam in a wireless communication system, an apparatus and a method for selecting a beam for carrier aggregation (CA) in a wireless communication system, an apparatus and a method for selecting a beam by considering channel quality of a secondary carrier in a wireless communication system, an apparatus and a method for selecting a common beam of carriers for CA in a wireless communication system, and an apparatus and a method for guaranteeing performance of a primary carrier and preventing performance degradation of a secondary carrier in a wireless communication system.

In accordance with an aspect of the disclosure, there is provided a method for operating a first device that performs communication in a wireless communication system, the method including: measuring beam pairs using signals transmitted from a second device using a plurality of carriers; determining a beam pair for the plurality of carriers based on measurement values, obtained by the measuring, for the beam pairs; and transmitting, to the second device, information indicating a transmit beam of the determined beam pair, wherein the measurement values include measurement values for a primary carrier and measurement values for at least one secondary carrier.

In accordance with an aspect of the disclosure, there is provided an apparatus for a first device that performs communication in a wireless communication system, the apparatus including: a transceiver configured to transmit and receive signals; and at least one processor configured to: measure beam pairs using signals transmitted from a second device using a plurality of carriers; determine a beam pair for the plurality of carriers based on measurement values for the beam pairs; and control to transmit, to the second device, information indicating a transmit beam of the beam pair, wherein the measurement values include measurement values for a primary carrier and measurement values for at least one secondary carrier.

In accordance with an aspect of the disclosure, there is provided method for operating a first device that performs communication in a wireless communication system, the method including: obtaining measurement values for beam pairs based on signals transmitted and/or received using a plurality of carriers; determining a beam pair for the plurality of carriers based on the obtained measurement values for the beam pairs; and transmitting, to a second device, information indicating a transmit beam of the determined beam pair, wherein the obtained measurement values include measurement values for a primary carrier and measurement values for at least one secondary carrier.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
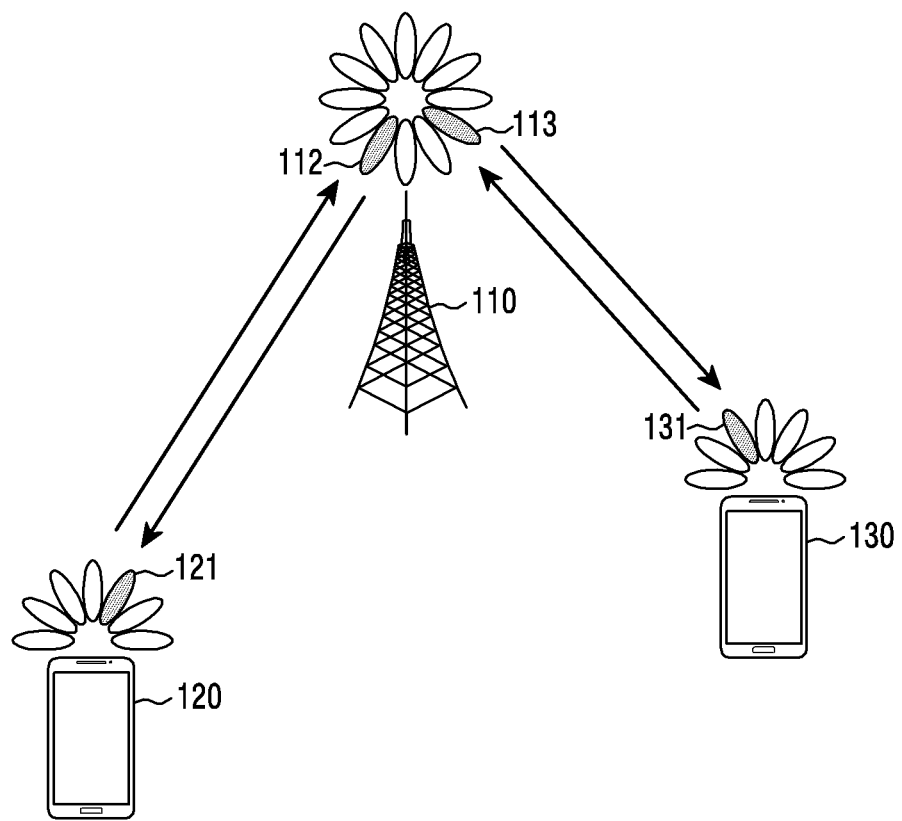
FIG. 1 illustrates a wireless communication system according to an embodiment.

Terms used in the present disclosure are used for describing particular embodiments and are not intended to limit the present disclosure. A singular expression may include a plural expression unless plainly different according to a context or unless explicitly represented otherwise. Further, unless defined otherwise, all the terms used herein, including technical and scientific terms, may have the same meanings as those generally understood by a person skilled in the art to which the present disclosure pertains. Among terms used in the present disclosure, the terms defined in a general dictionary may be interpreted to have the same or similar meanings with the context of the relevant art, and, unless explicitly defined in this disclosure, it shall not be interpreted ideally or excessively as formal meanings. In some cases, even when terms are defined in this disclosure, the terms should not be interpreted to exclude the embodiments.

In various embodiments to be described below, a hardware approach may be described as an example. However, it is understood that various embodiments may include a technology using both hardware and software, and various embodiments do not exclude a software-based approach.

Various embodiments provide an apparatus and a method for selecting a beam in a wireless communication system. More specifically, the present disclosure describes a technique for selecting a common beam used for a plurality of carriers in the wireless communication system.

Terms indicating signals, terms indicating signal propagation characteristics (e.g., directivity), terms indicating control information, terms indicating network entities, and terms indicating components of a device, which are used in the following descriptions, are for the sake of explanations.

Accordingly, the present disclosure is not limited to the terms to be described, and may use other terms having technically identical or similar meaning.

In this disclosure, to determine whether a specific condition is satisfied or fulfilled, expressions such as "greater than" or "less than" are used by way of example and expressions such as "greater than or equal to" or "less than or equal to" are also applicable and not excluded. For example, a condition defined with "greater than or equal to" may be replaced by "greater than" (or vice-versa), a condition defined with "less than or equal to" may be replaced by "less than" (or vice-versal), etc.

The present disclosure provides various embodiments using terms used in some communication standards by way of example. Various embodiments may be easily used in or may be applicable to other communication systems.

The expressions "A and/or B," "A or B," "at least one of A and B," "at least one of A or B," "one or more of A and B," and "one or more of A or B," as used herein, may include all possible combinations of the items that are enumerated together. For example, the term "A and/or B" or "at least one of A and B" may designate (1) at least one A, (2) at least one B, or (3) both of at least one A and at least one B.

FIG. 1 illustrates a wireless communication system according to an embodiment. FIG. 1 depicts a base station 110, a terminal 120, and a terminal 130 as some of nodes that use a radio channel in the wireless communication system. While FIG. 1 depicts a single base station, another base station that is the same as or similar to the base station 110 may be further included.

The base station 110 is a network infrastructure that provides radio access to the terminals 120 and 130. The base station 110 has coverage defined as a geographical area based on a signal transmission distance. The base station 110 may be referred to as an access point (AP), an eNodeB (eNB), a 5th generation node (5G node), a next generation nodeB (gNB), a wireless point, a transmission/reception point (TRP), or other terms having a technically equivalent meaning.

The terminal 120 and the terminal 130 are each used by a user and communicate with the base station 110 over a radio (or wireless) channel. In some cases, at least one of the terminal 120 and the terminal 130 may operate without a user's involvement. That is, at least one of the terminal 120 and the terminal 130 may perform machine type communication (MTC) and may not be carried by the user. The terminal 120 and the terminal 130 each may be referred to as a user equipment (UE), a mobile station, a subscriber station, a remote terminal, a wireless terminal, a user device, or other terms having a technically equivalent meaning.

The base station 110, the terminal 120, and the terminal 130 may transmit and receive radio signals (e.g., wireless signals) in a millimeter wave (mmWave) band (e.g., 28 GHz, 30 GHz, 38 GHz, 60 GHz). To improve channel gain, the base station 110, the terminal 120, and the terminal 130 may conduct (or perform) beamforming. Herein, the beamforming may include transmit beamforming (or transmission beamforming) and receive beamforming (or reception beamforming). That is, the base station 110, the terminal 120, and the terminal 130 may apply directivity to a transmit signal or a receive signal. To this end, the base station 110 and the terminals 120 and 130 may select serving beams 112, 113, 121, and 131 through a beam search or beam management procedure. After the serving beams 112, 113, 121, and 131 are selected, communications may be performed using resources that are quasi co-located (QCL) with resources used for transmitting the serving beams 112, 113, 121, and 131.

If large-scale properties of a channel that carries a symbol on a first antenna port may be inferred from a channel that carries a symbol on a second antenna port, the first antenna port and the second antenna port may be said to be QCL. For example, the large-scale properties may include at least one of delay spread, Doppler spread, Doppler shift, average gain, average delay, and spatial receive parameter.

Figure 2:
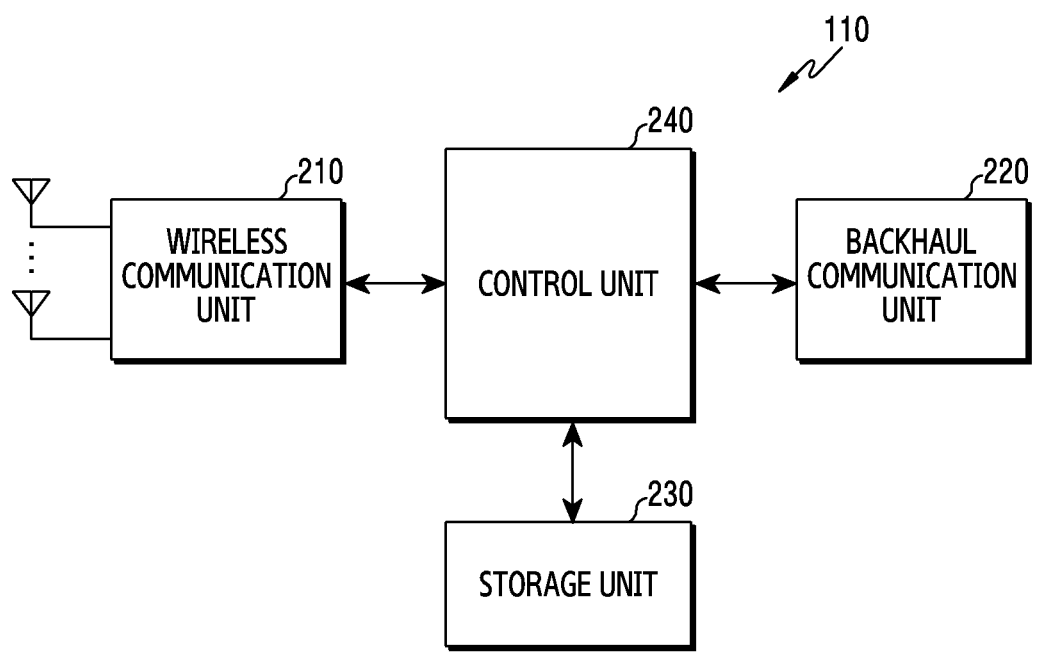
FIG. 2 illustrates a base station in a wireless communication system according to an embodiment.

FIG. 2 illustrates a base station 110 in a wireless communication system according to an embodiment. FIG. 2 depicts a configuration of the base station 110. In the following description, it is understood that a term such as "module", "unit", "portion", "-or" or "-er" indicates a unit for processing at least one function or operation, and may be implemented using hardware, software, or a combination of hardware and software.

Referring to FIG. 2, the base station 110 includes a wireless communication unit 210 (e.g., wireless communicator or wireless communication interface), a backhaul communication unit 220 (e.g., backhaul communicator or backhaul communication interface), a storage unit 230 (e.g., storage), and a control unit 240 (e.g., at least one processing device).

The wireless communication unit 210 may transmit and receive signals over a radio (or wireless) channel. For example, the wireless communication unit 210 performs a conversion function between a baseband signal and a bit string (or bit stream) according to a physical layer standard of the system. By way of further example, when data is transmitted, the wireless communication unit 210 generates complex symbols by encoding and modulating a transmit bit string (or transmission bit stream). Similarly, when data is received, the wireless communication unit 210 restores a receive bit string (or reception bit stream) by demodulating and decoding a baseband signal.

Furthermore, the wireless communication unit 210 up-converts the baseband signal to a radio frequency (RF) band signal, transmits the RF band signal via an antenna, and down-converts an RF band signal received via an antenna to a baseband signal. To this end, the wireless communication unit 210 may include at least one of a transmit filter, a receive filter, an amplifier, a mixer, an oscillator, a digital to analog convertor (DAC), an analog to digital convertor (ADC), and the like. In addition, the wireless communication unit 210 may include or utilize a plurality of transmit (or transmission) and receive (or reception) paths. Further, the wireless communication unit 210 may include at least one antenna array including a plurality of antenna elements.

In terms of hardware, the wireless communication unit 210 may include a digital unit and an analog unit, and the analog unit may include a plurality of sub-units according to an operating power and an operating frequency. The digital unit may include at least one processor (e.g., a digital signal processor (DSP)).

As described above, the wireless communication unit 210 transmits and receives signals. Hence, the entirety or a part of the wireless communication unit 210 may be referred to as a transmitter, a receiver, or a transceiver. Hereinbelow, transmission and the reception over a radio (or wireless) channel may include the above-described processing of the wireless communication unit 210.

The backhaul communication unit 220 provides an interface for communicating with other nodes in the network. That is, the backhaul communication unit 220 converts a bit sting transmitted from the base station 110 to another node, for example, to another access node, another base station, an upper node, or a core network, to a physical signal, and converts a physical signal received from the other node to a bit string.

The storage unit 230 stores data, such as a basic program, an application program, configuration information, settings, and the like for operating the base station. The storage unit 230 may include a volatile memory, a non-volatile memory, or a combination of a volatile memory and a non-volatile memory. The storage unit 230 provides the stored data in response to a request from the control unit 240.

The control unit 240 controls general operations of the base station. For example, the control unit 240 transmits and receives signals through the wireless communication unit 210 or the backhaul communication unit 220. Also, the control unit 240 records data to the storage unit 230 and reads data from the storage unit 230. The control unit 240 may execute functions of a protocol stack required by or included in a particular communication standard. According to another embodiment, the protocol stack may be included in and/or implemented via the wireless communication unit 210. To this end, the control unit 240 may include at least one processor.

According to an embodiment, the control unit 240 may determine at least one beam to communicate with a terminal (e.g., the terminal 120). For example, the control unit 240 may determine a transmit (or transmission) beam of the base station 110 based on a feedback from the terminal. Further, the control unit 240 may determine at least one of a receive (or reception) beam of the base station 110 and a transmit beam of the terminal using a signal transmitted from the terminal. Additionally, the control unit 240 may transmit information indicating the determined transmit beam of the terminal, to the terminal. For example, the control unit 240 may control the base station 110 to carry out operations explained below according to one or more embodiments.

Figure 3:
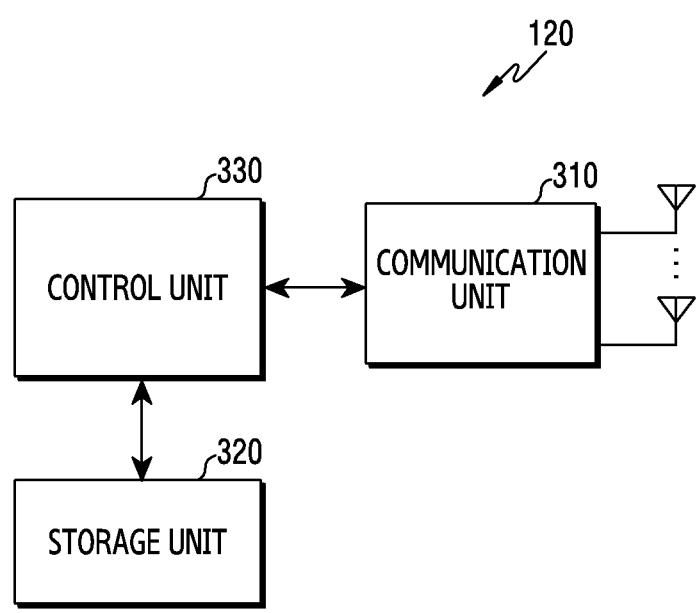
FIG. 3 illustrates a terminal in a wireless communication system according to an embodiment.

FIG. 3 illustrates a terminal 120 in a wireless communication system according to an embodiment. In the following description, it is understood that a term such as "module", "unit", "portion", "-or" or "-er" indicates a unit for processing at least one function or operation, and may be implemented using hardware, software, or a combination of hardware and software.

Referring to FIG. 3, the terminal 120 includes a communication unit 310 (e.g., communicator or communication interface), a storage unit 320 (e.g., storage), and a control unit 330 (e.g., at least one processor). By way of example, the terminal 120 may be a cellular phone or other device that communicates over a cellular network (such as a 5G or pre-5G network).

The communication unit 310 may transmit and receive signals over a radio channel. For example, the communication unit 310 performs a conversion function between a baseband signal and a bit string according to a physical layer standard of the system. By way of further example, when data is transmitted, the communication unit 310 generates complex symbols by encoding and modulating a transmit bit string. Similarly, when data is received, the communication unit 310 restores a receive bit string by demodulating and decoding a baseband signal. Furthermore, the communication unit 310 up-converts the baseband signal to an RF band signal, transmits the RF band signal via an antenna, and down-converts an RF band signal received via the antenna to a baseband signal. For example, the communication unit 310 may include at least one of a transmit filter, a receive filter, an amplifier, a mixer, an oscillator, a DAC, an ADC, and the like.

Also, the communication unit 310 may include or utilize a plurality of transmit and receive paths. Further, the communication unit 310 may include at least one antenna array including a plurality of antenna elements. In terms of hardware, the communication unit 310 may include a digital circuit and an analog circuit (e.g., an RF integrated circuit (RFIC)). Herein, the digital circuit and the analog circuit may be implemented as a single package. Also, the communication unit 310 may include a plurality of RF chains. Further, the communication unit 310 may perform beamforming.

As described above, the communication unit 310 transmits and receives signals. Hence, the entirety or a part of the communication unit 310 may be referred to as a transmitter, a receiver, or a transceiver. Hereinbelow, the transmission and the reception over the radio channel may include the above-described processing of the communication unit 310.

The storage unit 320 stores data, such as a basic program, an application program, configuration information, settings, and the like for operating the terminal. The storage unit 320 may include a volatile memory, a non-volatile memory, or a combination of a volatile memory and a non-volatile memory. The storage unit 320 provides the stored data according to a request from the control unit 330.

The control unit 330 controls general operations of the terminal. For example, the control unit 330 transmits and receives signals through the communication unit 310. Also, the control unit 330 records data to the storage unit 320 and reads data from the storage unit 320. The control unit 330 may execute functions of a protocol stack required by or included in a particular communication standard. To this end, the control unit 330 may include at least one processor or microprocessor, or may be part of a processor. Part of the communication unit 310 and the control unit 330 may be referred to as a communication processor (CP).

According to an embodiment, the control unit 330 may determine at least one beam for communication with a base station (e.g., the base station 110). For example, the control unit 330 may determine at least one of a receive beam of the terminal 120 and a transmit beam of the base station using a signal transmitted from the base station. Further, the control unit 330 may transmit information indicating the determined transmit beam of the base station, to the base station. For example, the control unit 330 may determine the transmit beam of the base station based on a request from the base station. Further, the control unit 330 may control the terminal to carry out operations, to be explained below, according to one or more embodiments.

Figure 4:
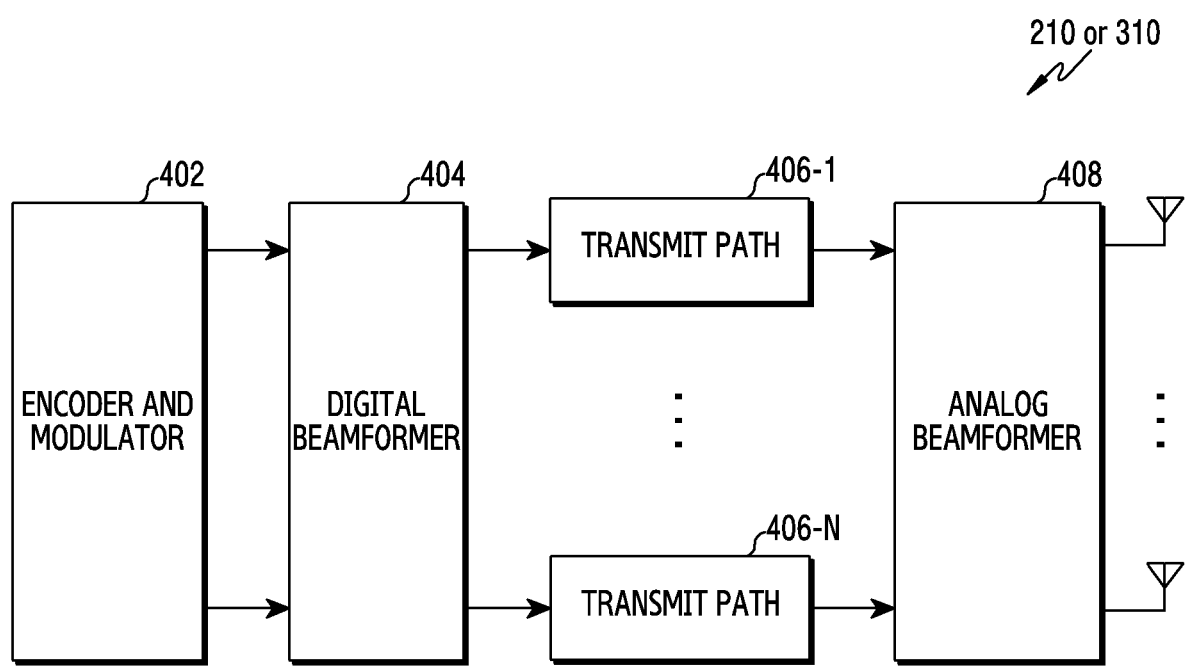
FIG. 4 illustrates a communication unit in a wireless communication system according to an embodiment.

FIG. 4 illustrates a communication unit 210 or 310 in a wireless communication system according to an embodiment. FIG. 4 depicts a detailed configuration of the wireless communication unit 210 of FIG. 2 or the communication unit 310 of FIG. 3. More specifically, FIG. 4 depicts components, as part of the wireless communication unit 210 of FIG. 2 or the communication unit 310 of FIG. 3, for performing the beamforming.

Referring to FIG. 4, the wireless communication unit 210 or the communication unit 310 includes an encoder and modulator 402, a digital beamformer 404, a plurality of transmit (or transmission) paths 406-1 through 406-N, and an analog beamformer 408.

The encoder and modulator 402 performs channel encoding. To perform the channel encoding, at least one of a low density parity check (LDPC) code, a convolution code, and a polar code may be used. The encoder and modulator 402 generates modulation symbols through constellation mapping.

The digital beamformer 404 beamforms a digital signal (e.g., the modulation symbols). To this end, the digital beamformer 404 may multiply or apply beamforming weights to the modulation symbols. Herein, the beamforming weights are used to change a level and a phase of a signal and may be referred to as a precoding matrix or a precoder. The digital beamformer 404 outputs the digital-beamformed modulation symbols to the plurality of transmit paths 406-1 through 406-N. In this case, according to a multiple input multiple output (MIMO) transmission scheme, the modulation symbols may be multiplexed or the same modulation symbols may be fed to the plurality of transmit paths 406-1 through 406-N.

The transmit paths 406-1 through 406-N convert the digital-beamformed digital signals to analog signals. To this end, the transmit paths 406-1 through 406-N each may include an inverse fast Fourier transform (IFFT) operator, a cyclic prefix (CP) adder or inserter, a DAC, and an up-converter. The CP adder is used for orthogonal frequency division multiplexing (OFDM), and may be excluded if another physical layer scheme (e.g., filter bank multi-carrier (FBMC)) is applied. That is, the transmit paths 406-1 through 406-N provide an independent signal process for a plurality of streams generated through the digital beamforming. Notably, depending on the implementation, some of the components of the transmit paths 406-1 through 406-N may be used in common.

The analog beamformer 408 beamforms the analog signals. To this end, the analog beamformer 408 may multiply or apply the beamforming weights to the analog signals. Herein, the beamforming weights are used to change the level and the phase of the signal. More specifically, the analog beamformer 408 may be variously configured, according to a connection structure between the transmit paths 406-1 through 406-N and the antennas. For example, the transmit paths 406-1 through 406-N each may be connected to one antenna array, or the transmit paths 406-1 through 406-N may be connected to one antenna array. Further, the transmit paths 406-1 through 406-N may be adaptively connected to one antenna array, or may be connected to two or more antenna arrays.

Various embodiments are related to the beam selection of the terminal 120 or the base station 110 in the wireless environment using multiple carriers. Recently, wireless communication in a high frequency band has been studied to address a lack of frequency. However, since high-frequency wireless communication is subject to excessive path loss, beamforming can improve transmission and reception performance. The beamforming may be fulfilled using an RF element that enables beam steering. Using the RF element, the base station may transmit a reference signal by periodically changing the beam, and the terminal may measure a signal strength (e.g., reference signal received power (RSRP), beam RSRP (BRSRP), channel state information (CSI), etc.) of each beam and then select the beam accordingly.

Carrier aggregation (CA) according to one or more embodiment improves data rate by using a plurality of carriers. To efficiently adopt the CA to the beamforming system, RF elements allowing the beam steering per carrier may be added and an optimal beam per carrier may be selected. However, it may be difficult to use the RF element for each carrier because of limitations on cost and power consumption. Accordingly, a single RF element may be used even though multiple carriers are used. In this case, due to the single RF element, the beamforming is commonly performed on the multiple carriers. That is, a single beam of the same direction is used in the carriers. Such a structure according to an embodiment is described in FIG. 5.

Figure 5:
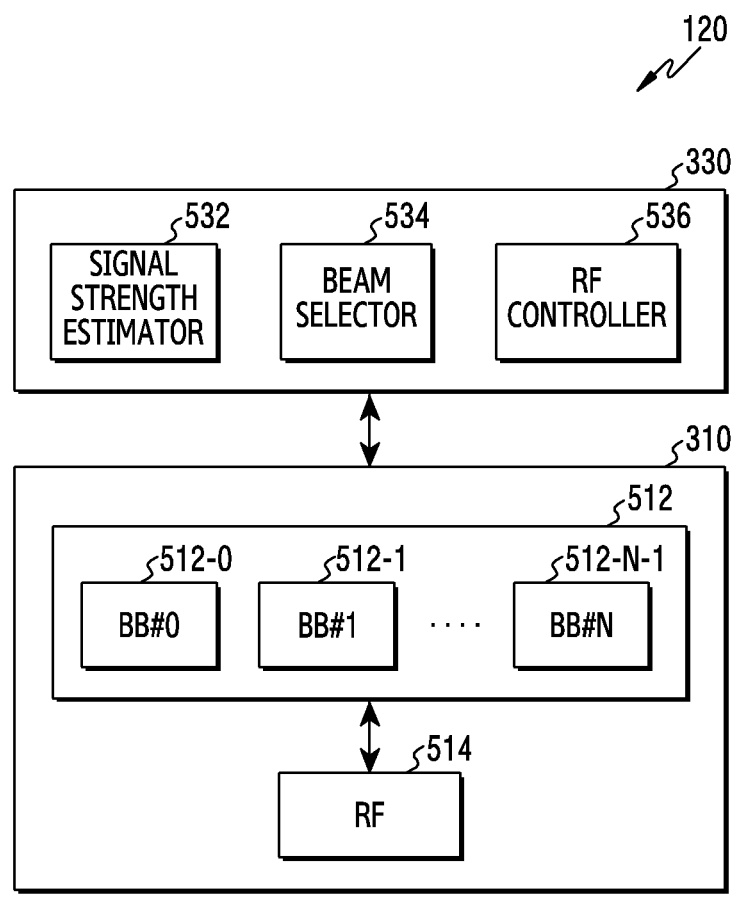
FIG. 5 illustrates a logical structure of a terminal in a wireless communication system according to an embodiment.

FIG. 5 illustrates a logical structure of a terminal 120 in a wireless communication system according to an embodiment. FIG. 5 illustrates, as the logical configuration of the terminal 120, a functional structure of the control unit 330 and the communication unit 310 of FIG. 3.

Referring to FIG. 5, the control unit 330 includes a signal strength estimator 532, a beam selector 534, and an RF controller 536. The communication unit 310 includes a based band (BB) module 512 and an RF module 514.

The signal strength estimator 532 measures reference signals transmitted from the base station, and generates measurement values indicating signal strength. Herein, one measurement value is determined for one beam pair that includes a transmit beam of the base station and a receive beam of the terminal. The beam selector 534 selects an optimal beam pair based on the measurement values. The selected beam pair may be used for the communication (e.g., subsequent communications). The RF controller 536 controls the RF module 514 to apply the receive beam of the terminal of the selected beam pair. That is, the RF controller 536 controls the RF module 514 to perform the transmit or receive beamforming using phase/amplitude values corresponding to the selected receive beam, that is, analog beamforming matrix/precoder. To this end, the RF controller 536 may transmit a control signal indicating the phase/amplitude values to the RF module 514.

The BB module 512 processes a baseband signal. The BB module 512 may include sub-modules 512-0 through 512-N−1 corresponding to N-ary carriers respectively. Herein, the sub-modules 512-0 through 512-N−1 may be hardware that is physically divided. Alternatively, the sub-modules 512-0 through 512-N−1 may be logical objects, and one hardware may perform parallel calculations for the N-ary carriers. That is, logically, the BB module 512 provides the individual calculation function for the N-ary carriers.

The RF module 514 processes an RF signal. The RF module 514 includes an analog beamforming means (e.g., the analog beamformer 408). Since the RF module 514 processes the baseband signals for the N-ary carriers processed by the BB module 512, the RF module 514 applies one transmit or receive beam to the N-ary carriers. In other words, the RF module 514 may perform the beamforming using a single beam for a broadband signal including all of the N-ary carriers.

The CA includes a primary carrier and a secondary carrier. Herein, the carrier may be referred to as a component carrier (CC). Since quality of service (QoS) of the primary carrier is related to system stability, the QoS may generally be required to exceed a specific level. A beam may therefore be selected based on the primary carrier. According to the beam selection based on the primary carrier, small channel difference of the primary carrier and the secondary carrier is advantageous in a system using the single RF element. However, channel similarity is not guaranteed, and severe channel difference between the carriers may occur according to polarization based on the beam direction. An example of the channel difference will now be described with reference to FIG. 6.

Figure 6:
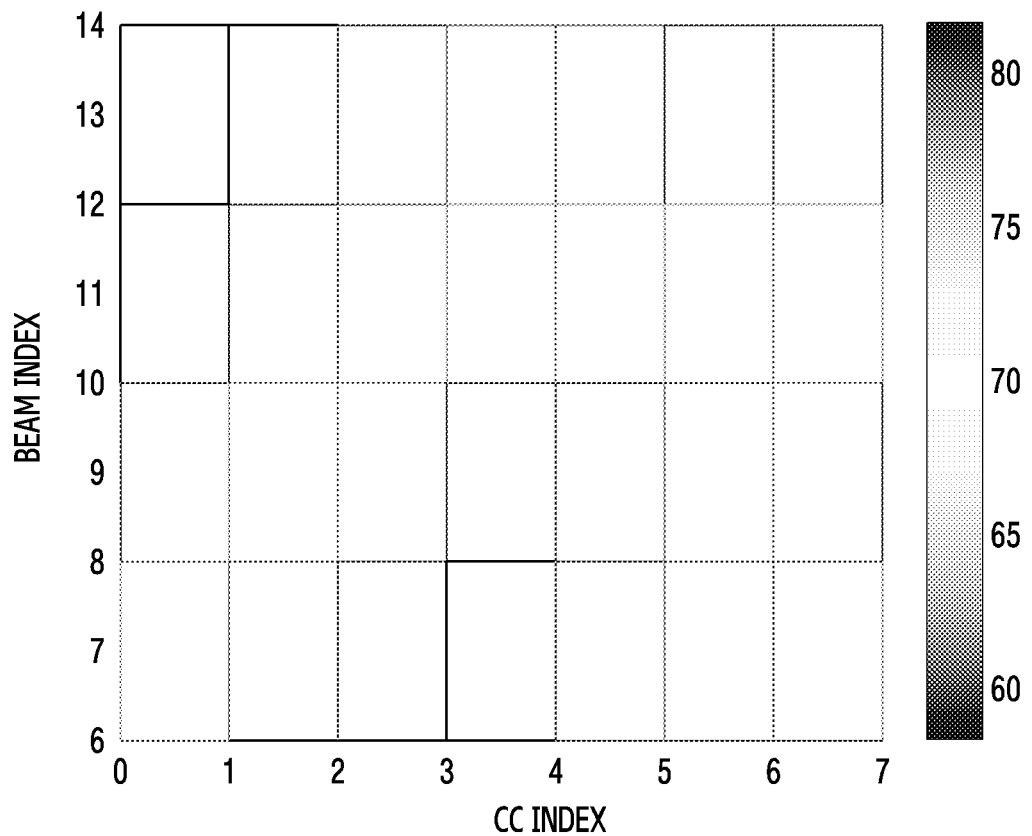
FIG. 6 illustrates a signal strength per beam for carriers in a wireless communication system according to an embodiment.

FIG. 6 illustrates a signal strength per beam for carriers in a wireless communication system according to an embodiment. FIG. 6 is a graph of a signal strength level of the carriers based on the beam direction in an indoor environment. Referring to FIG. 6, a boresight of the beam #14 is 0 degrees. As the beam number decreases, a propagation direction of a corresponding beam changes to a side. In the experiment environment of FIG. 6, a reflected wave occurs if beams having an index below 10 are used. If the base station uses the beam #14, signal strength values of the carriers are similar. However, in response to the beam #10 having the reflected wave, the signal strength for the carriers #3 and #4 is much lower than the carrier #0. In addition, as the beam changes, the signal strength between the carriers changes differently.

Since the polarization varies even at a fixed position according to an ambient environment, it is not easy to predict a channel size of another secondary carrier with the channel of the primary carrier. Hence, the beam control using only the primary carrier may degrade the performance of the secondary carrier, to thereby greatly decrease the total data rate. Hereinbelow, various embodiments for selecting a beam in consideration of the performance of the secondary carrier will be explained.

Figure 7:
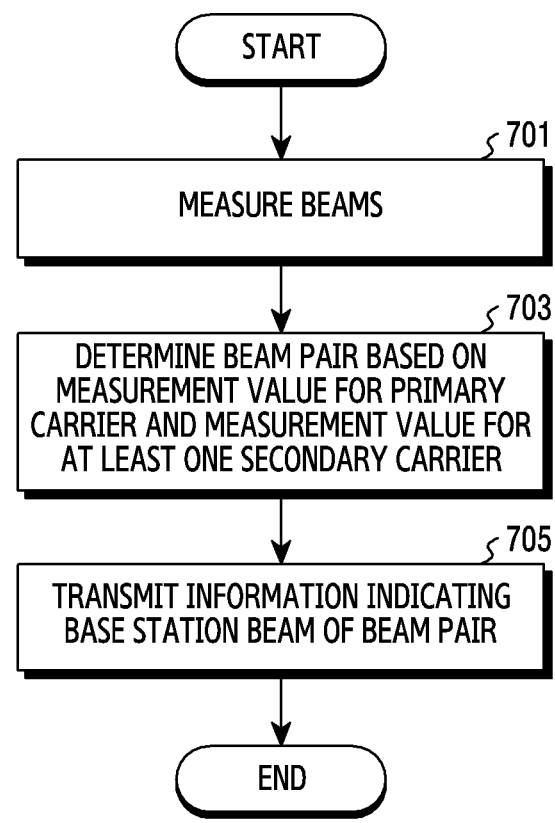
FIG. 7 illustrates a flowchart of operations of a terminal in a wireless communication system according to an embodiment.

FIG. 7 illustrates a flowchart of operations of a terminal in a wireless communication system according to an embodiment. For example, FIG. 7 illustrates an operating method of the terminal 120.

Referring to FIG. 7, in operation 701, the terminal measures beams. Herein, the measurement may be conducted per beam pair. More specifically, the terminal may identify, from system information, a beam transmission period that is used at least once by transmit beams of the base station, and perform the measurement according to the beam transmission period. Herein, the beam transmission period may be referred to as a beam reference signal (BRS) period or a synchronization signal (SS) burst.

In operation 703, the terminal determines a beam pair based on a measurement value for a primary carrier and a measurement value for at least one secondary carrier. That is, according to one or more embodiments, to determine an optimal beam pair, the secondary carrier may be further considered in addition to the primary carrier. In other words, signal strength of at least one secondary carrier may affect the beam pair selection result. In some cases, however, only the signal strength of the primary carrier may affect the beam pair selection result.

In operation 705, the terminal transmits information indicating the base station beam of the determined beam pair. That is, the terminal selects or determines an optimal beam pair, and then transmits the information indicating the transmit beam, which belongs to the selected beam pair, of the base station. In so doing, one or more beams may be indicated. The beam indication information may include a beam index and/or a resource index to which an RS or an SS transmitted using the corresponding beam is mapped.

In the embodiment of FIG. 7, the terminal determines the beam pair based on the measurement values. According to another embodiment, the method of FIG. 7 may be carried out to determine a single beam rather than the beam pair, for example, one of the transmit beam of the base station or the receive beam of the terminal. That is, the method of FIG. 7 may determine a single beam rather than the beam pair. If the receive beam is determined alone, operation 705 of FIG. 7 may be omitted. In the following disclosure, while the beam pair is determined for the sake of explanations, determination of a single beam may instead be implemented according to one or more embodiments. In this case, if only one of the receive beam or the transmit beam is determined, the other beam may be determined by the base station based on a feedback of the terminal. For example, the terminal may determine a receive beam of the terminal and feed measurement values back to the base station, to thereby allow the base station to determine the transmit beam according to one or more other embodiments.

As described above with reference to FIG. 7, the terminal may select the beam pair based on the measurement value for the primary carrier and the measurement value for at least one secondary value. Hence, in an environment where the same beam is used for multiple carriers, the beam selection may be fulfilled by considering the performance of the secondary carrier. For more effective beam pair selection, reliability of the measurement value may be improved. A method for processing the measurement value according to an embodiment will now be described with reference to FIG. 8.

Figure 8:
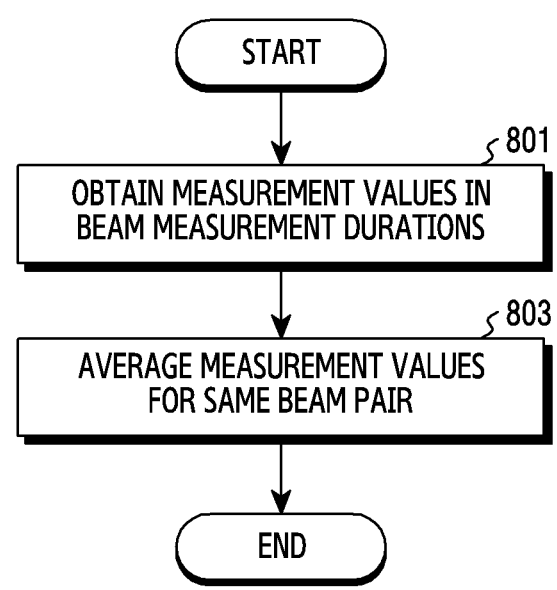
FIG. 8 illustrates a flowchart for processing a measurement value in a wireless communication system according to an embodiment.

FIG. 8 illustrates a flowchart for processing a measurement value in a wireless communication system according to an embodiment. For example, FIG. 8 illustrates an operating method of the terminal 120.

Referring to FIG. 8, in operation 801, the terminal obtains measurement values in a plurality of beam measurement durations. For example, the terminal may receive RRs or SRs by changing a receive beam in each beam transmission period, and may measure signal strength. Thus, the terminal may acquire measurement values per beam pair. The measurement values for one beam pair include measurement values per carrier. That is, one signal strength value in the measurement value corresponds to a combination of a beam pair and a carrier.

In operation 803, the terminal averages the measurement values for the same beam pair. An initial measurement value acquired through one measurement for one beam pair may include an estimation error, and the estimation error may cause a beam selection error. To reduce the beam selection error, the terminal may average two or more measurement values. Next, the terminal may select the beam of the measurement values with higher reliability. This operation may be referred to as refinement of the measurement value.

As stated above, the terminal may select the beam pair based on the measurement value for the primary pair and the measurement value for at least one secondary carrier. A method of selecting the beam pair according to an embodiment will now be described with reference to FIG. 9.

Figure 9:
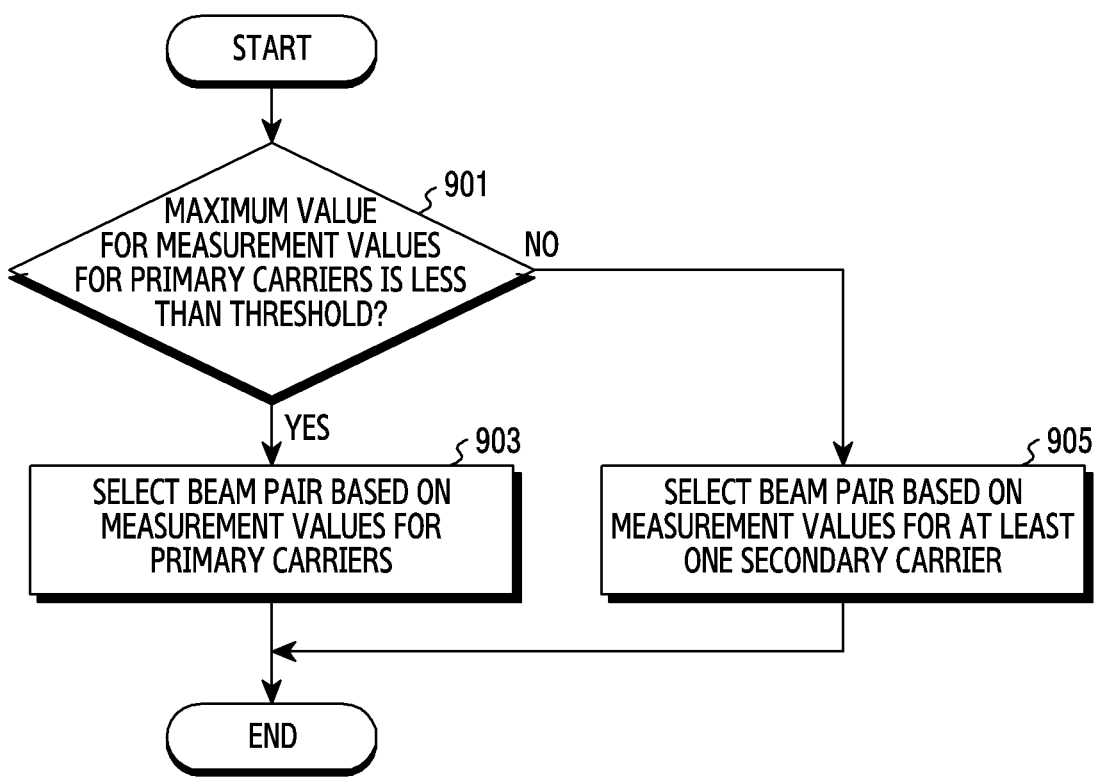
FIG. 9 illustrates a flowchart of a method for selecting a beam in a wireless communication system according to an embodiment.

FIG. 9 illustrates a flowchart of a method for selecting a beam in a wireless communication system according to an embodiment. For example, FIG. 9 illustrates an operating method of the terminal 120.

Referring to FIG. 9, in operation 901, the terminal determines whether a maximum value among measurement values for primary carriers is less than a threshold (e.g., a predetermined threshold value). Herein, the threshold may be defined as a signal strength value that is required to guarantee or predetermined to provide at least a specific QoS level. For example, the terminal determines whether the QoS over the specific level is guaranteed in the primary carrier having the maximum measurement value.

If the maximum value is less than the threshold, the terminal selects a beam pair based on the measurement values for the primary carriers in operation 903. If the maximum value among the measurement values for the primary carriers is less than the threshold, this indicates that all the measurement values for the primary carriers are less than the threshold. In this case, since it is advantageous to first consider the performance of the primary carrier, the terminal may select the beam pair based on the measurement values for the primary carriers.

If the maximum value is not less than the threshold, the terminal selects a beam pair based on measurement values for at least one secondary carrier in operation 905. In so doing, the terminal may select an optimal beam pair from some of the beam pairs. Since the maximum value among the measurement values for the primary carrier is greater than the threshold, at least one beam pair has the measurement value over the threshold. This indicates that at least one beam pair guarantees the QoS over the specific level in the primary carrier. Accordingly, the terminal may select one beam pair from at least one beam pair that guarantees the QoS over the specific level in the primary carrier, by considering performance of the secondary carrier.

As described above, the terminal may select the beam pair based on the measurement value for the primary carrier and the measurement value for at least one secondary carrier. It is understood, however, that one or more other embodiments are not limited thereto. For example, according to another embodiment, the terminal may first determine a metric for the beam pair using the measurement values, and select the optimal beam pair according to comparison results of the metrics. Herein, the metric may be referred to as a priority, a priority value, a representative value, a selection factor, performance information, a performance value, or other term having a technically equivalent or similar meaning. Hereinbelow, an embodiment for selecting the beam using the metric will be explained with reference to FIG. 10 and FIG. 11.

Figure 10:
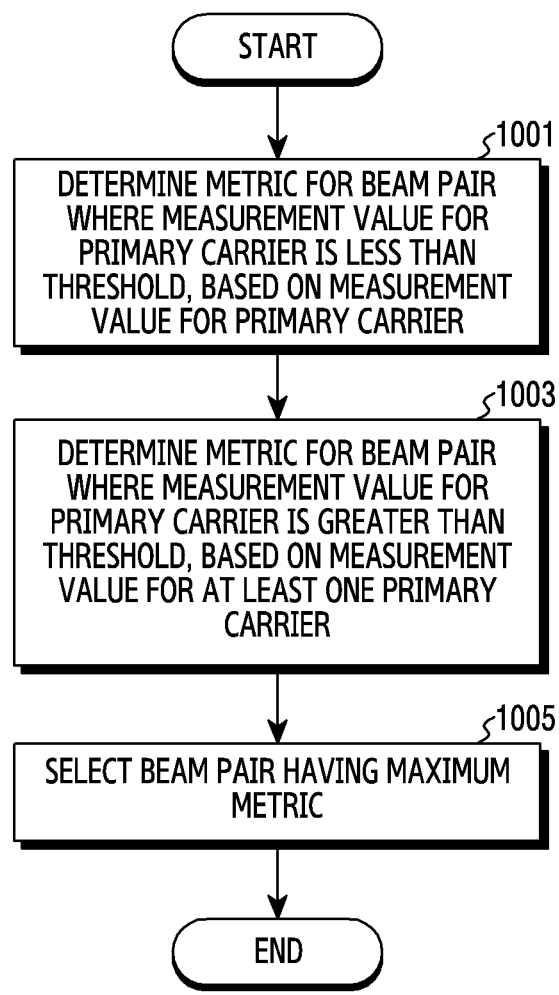
FIG. 10 illustrates a flowchart of another method for selecting a beam in a wireless communication system according to an embodiment.

FIG. 10 illustrates a flowchart of another method for selecting a beam in a wireless communication system according to an embodiment. For example, FIG. 10 illustrates an operating method of the terminal 120.

Referring to FIG. 10, in operation 1001, the terminal determines a metric (or metric value) for a beam pair where a measurement value for a primary carrier is less than a threshold, based on the measurement value for the primary carrier. If the measurement value for the primary carrier is less than the threshold, the primary carrier mainly affects performance of the corresponding beam pair. If there is no beam pair where the measurement value for the primary carrier is less than the threshold, this operation may be omitted.

In operation 1003, the terminal determines a metric (or metric value) for a beam pair where the measurement value for the primary carrier is greater than the threshold, based on a measurement value for at least one primary carrier. If the measurement value for the primary carrier is greater than the threshold, the at least one secondary carrier mainly affects the performance of the corresponding beam pair. If there is no beam pair where the measurement value for the primary carrier is greater than the threshold, this operation may be omitted.

In operation 1005, the terminal selects a beam pair having a maximum metric (or metric value). Since the metric (or metric value) is information indicating performance of a corresponding beam pair, the maximum metric may be understood as the maximum performance. According to another embodiment, the terminal may select two or more beam pairs according to the order of their metrics.

Figure 11:
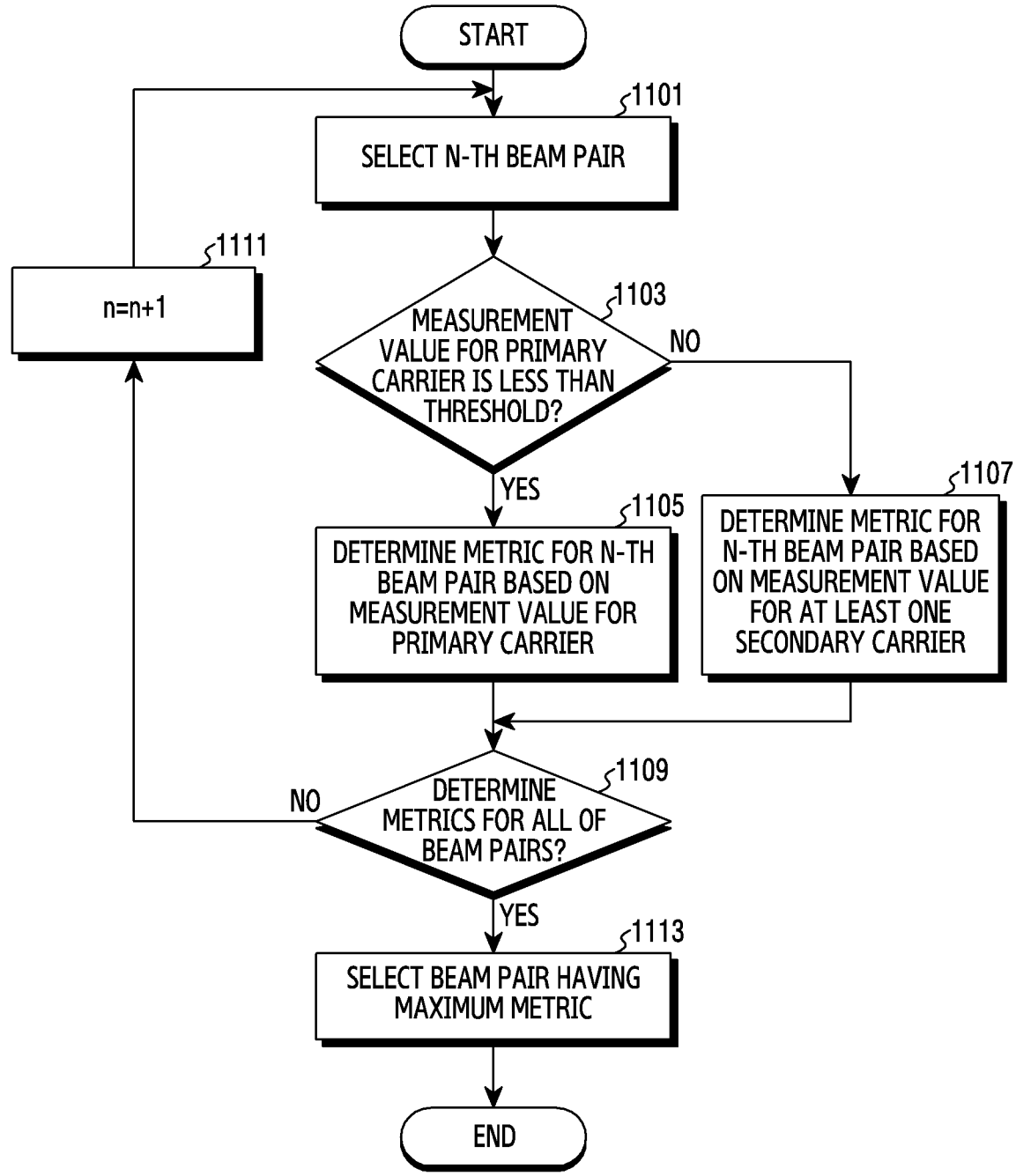
FIG. 11 illustrates a flowchart of yet another method for selecting a beam in a wireless communication system according to an embodiment.

FIG. 11 illustrates a flowchart of yet another method for selecting a beam in a wireless communication system according to an embodiment. For example, FIG. 11 illustrates an operating method of the terminal 120.

Referring to FIG. 11, in operation 1101, the terminal selects an n-th beam pair. At the initial execution of this method, n is initialized to 1. That is, initially, the terminal selects the first beam pair. The first beam pair may have the index 0 or 1.

In operation 1103, the terminal may determine whether a measurement value for a primary carrier is less than a threshold. Herein, the threshold may be defined as a signal strength value required to guarantee (or determined to provide) a specific QoS level. That is, the terminal determines whether the QoS over the specific level is guaranteed in the primary carrier if the n-th beam pair is used.

If the measurement value for the primary carrier is less than the threshold, the terminal determines a metric (or metric value) for the n-th beam pair based on the measurement value for the primary carrier in operation 1105. For example, the terminal may determine the metric for the n-th beam pair with the measurement value for the primary carrier, or determine the metric by normalizing the measurement value.

By contrast, if the measurement value for the primary carrier is greater than the threshold, the terminal determines a metric for the n-th beam pair based on a measurement value for at least one secondary carrier in operation 1107. For example, the terminal may determine the metric for the n-th beam pair with the measurement value for the at least one secondary carrier or with the normalized measurement value. In so doing, a corresponding weight may be given according to a size of the measurement value. In response to a plurality of secondary carriers, the metric may be determined by a combination (e.g., a sum, an average, etc.) of measurement values.

In operation 1109, the terminal determines whether metrics for all of the beam pairs are determined. If the metrics for all of the beam pairs are not determined, that is, if there is a beam pair for which the metric has not been determined, the terminal increases n by 1 in operation 1111, returns to operation 1101, and repeats operation 1103 through operation 1107 for a next beam pair.

If the metrics for all of the beam pairs are determined, the terminal determines a beam pair having the maximum metric in operation 1113. According to another embodiment, the terminal may select two or more beam pairs according to the order of their metrics.

As stated in FIG. 11, the terminal determines the metrics for the beam pairs and selects the optimal beam pair based on the metrics. In so doing, a beam pair selection policy may be reflected by a specific method for determining the metric. In FIG. 11, the QoS level for the primary carrier is considered first. This is because the performance of the primary carrier is considered first, which is directly related to the system stability. Hence, if the specific QoS level is not guaranteed in the primary carrier, the metric is determined based on the measurement value for the primary carrier, so as to select the beam with the primary carrier.

As described in FIG. 11, if the measurement value for the primary carrier is greater than the threshold, the metric for the corresponding beam pair is determined based on the measurement value for the at least one secondary carrier. According to an embodiment, only the measurement value for the at least one secondary carrier may affect the metric determination. According to another embodiment, in addition to the measurement value for the at least one secondary carrier, the measurement value for the primary carrier may affect the metric determination. In this case, it is desirable that contribution of the primary carrier to the metric is less than the case where the measurement value for the primary carrier is less than the threshold.

In FIG. 11, if the measurement value for the primary carrier is greater than the threshold, the metric is determined based on the measurement value for the at least one secondary carrier. A specific method for determining the metric based on the measurement value for the secondary carrier may vary. An embodiment for determining the metric based on the measurement value for the secondary carrier will now be explained with reference to FIG. 12.

Figure 12:
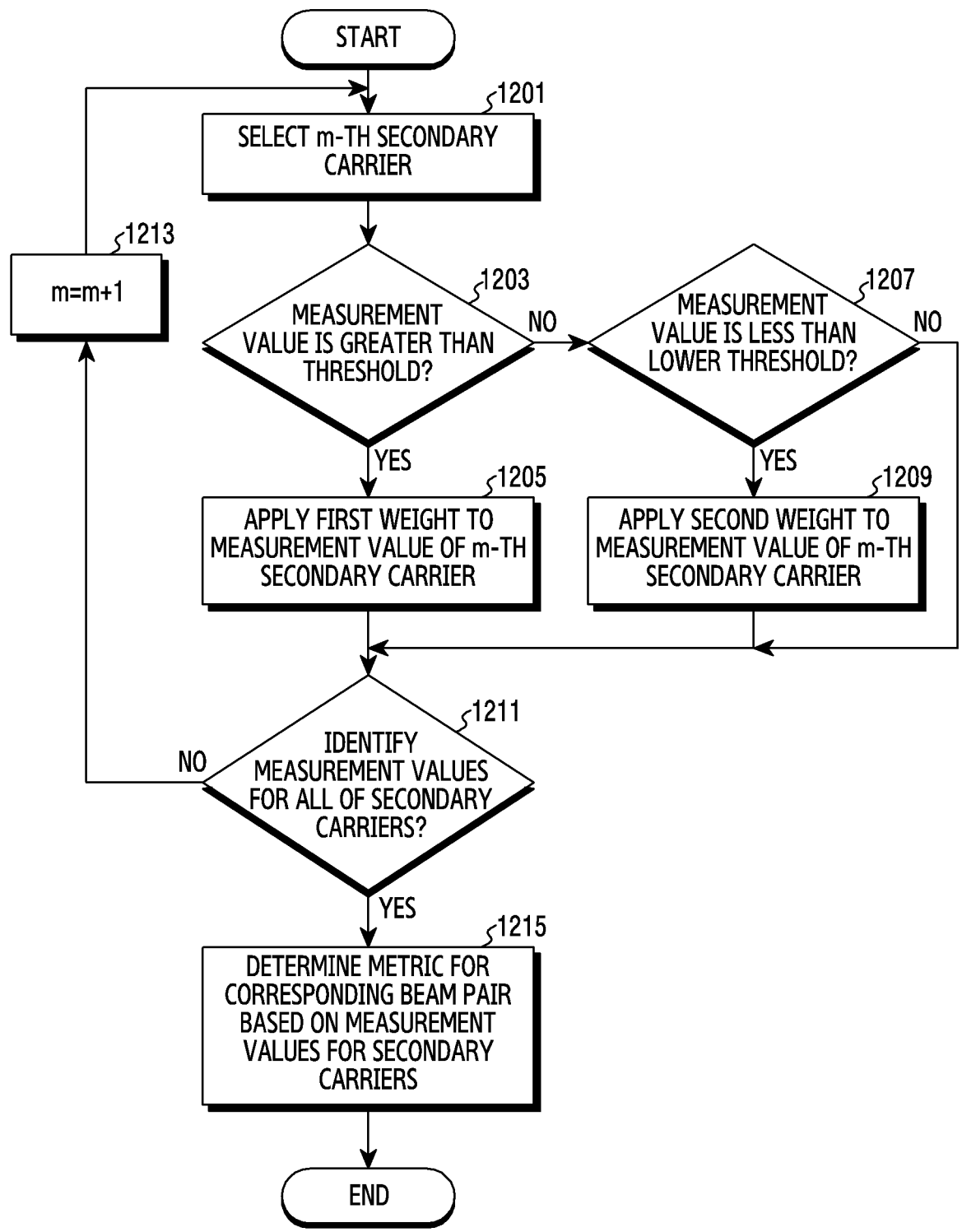
FIG. 12 illustrates a flowchart for determining a metric based on a measurement value for a secondary carrier in a wireless communication system according to various embodiments of the present disclosure.

FIG. 12 illustrates a flowchart for determining a metric based on a measurement value for a secondary carrier in a wireless communication system according to an embodiment. For example, FIG. 12 illustrates an operating method of the terminal 120.

Referring to FIG. 12, in operation 1201, the terminal selects an m-th secondary carrier. At the initial execution of this method, m is initialized to 1. That is, initially, the terminal selects the first secondary carrier. The first secondary carrier may have the index 0 or 1.

In operation 1203, the terminal may determine whether a measurement value for the m-th secondary carrier is greater than an upper threshold. Herein, the upper threshold may be determined based on the effect of a signal strength increase on a throughput. For example, the upper threshold may be defined as a signal strength value where a throughput increase based on the signal strength increase is less than a specific level.

If the measurement value is greater than the upper threshold, the terminal applies a first weight to the measurement value for the m-th secondary carrier in operation 1205. Applying the first weight decreases the corresponding measurement value. According to an embodiment, the first weight may be defined regardless of the measurement value, and the measurement value reduces at a specific rate. According to another embodiment, the first weight may be defined to reduce the measurement value to the same value. For example, the first weight may be defined to reduce the measurement value to a signal strength value where the throughput increase based on the signal strength increase is less than a specific or predetermined level. Thus, the effect of the measurement value greater than the upper threshold on the metric is lessened.

By contrast, if the measurement value is not greater than the upper threshold, the terminal determines whether the measurement value for the m-th secondary carrier is less than a lower threshold in operation 1207. According to an embodiment, the lower threshold may be defined based on a maximum value among measurement values for carriers with respect to the same beam pair. That is, the lower threshold may vary according to the beam pair. In this case, in operation 1207, the terminal identifies a secondary carrier having a signal strength value that is less than the maximum signal strength value measured in the same beam pair over a specific level. According to another embodiment, the lower threshold may be determined based on the effect of the signal strength decrease on the threshold decrease. For example, the lower threshold may be defined as the signal strength value where the throughput decrease based on the signal strength decrease is less than a specific level.

If the measurement value is not less than the lower threshold, the terminal applies a second weight to the measurement value for the m-th secondary carrier in operation 1209. Applying the second weight decreases the corresponding measurement value. According to an embodiment, the second weight may be defined regardless of the measurement value, wherein the measurement value reduces at a specific rate. According to another embodiment, the second weight may be defined to reduce the measurement value to the same value. For example, the second weight may be defined to reduce the measurement value to a signal strength value where the measurement value reaches zero or the throughput increase based on the signal strength increase is less than a specific level or predetermined level. Thus, the effect of the measurement value greater than the lower threshold on the metric is lessened.

In operation 1211, the terminal determines whether measurement values for all the secondary carriers are identified. If the measurement values for all the secondary carriers are not identified, that is, if there is a secondary carrier for which the measurement value has not been identified, the terminal increases m by 1 in operation 1213, returns to operation 1201, and repeats operation 1203 through operation 1209 for a next secondary carrier.

If the measurement values for all the secondary carriers are identified, the terminal determines a metric for a corresponding beam pair based on the measurement values for the secondary carriers in operation 1215. If the weight is applied in operation 1205 or operation 1209, the weighted measurement values are used. For example, the terminal may determine the metric by adding or averaging the measurement values, or by normalizing the sum or the average.

In FIG. 12, if the measurement value is greater than the upper threshold, the first weight is applied to the measurement value. This is to avoid selecting a corresponding beam pair despite the lower performance of another secondary carrier, due to the dominant signal strength that has little influence on the reception performance. In other words, since the signal strength greater than the upper threshold has little influence on the reception performance enhancement, the terminal reduces the probability of selecting the corresponding beam by applying the first weight, wherein the performance of another secondary carrier is further considered. Such an operation may be referred to as high level filtering.

The high level filtering may be excluded to determine superiority of the metrics having the same value. The high level filtering reduces the contribution to the metric for the measurement value that is greater than the upper threshold. However, if the metrics that are high level filtered have the same value, a difference between the metrics may occur because the high level filtering is excluded. Hence, if it is required to select the beam pairs having the metrics for the same value after the high level filtering, the terminal may select one beam pair based on the measurement value before the high level filtering.

In FIG. 12, if the measurement value is less than the lower threshold, the second weight is applied to the measurement value. In so doing, according to an embodiment, the second weight may be applied to the secondary carrier having the signal strength value that is smaller than a maximum signal strength measured in the same beam pair over a specific level. This considers automatic gain control (AGC). Since a gain value of the AGC is determined based on the carrier of the maximum receive power, if the signal strengths have the difference over the specific level, stationarity of the signal strength is not guaranteed despite the AGC. Thus, the terminal may reduce the probability of selecting the corresponding beam by applying the second weight. Such an operation may be referred to as low level filtering.

A method for selecting the beam pair using the metrics according to an embodiment is described below with reference to Equations 1-8.

The refinement of the measurement value may be performed based on Equation 1 below:

$$\Gamma_{b,c} = E\{\beta_{b,c}\} \quad (1)$$

In Equation 1, $\Gamma_{b,c}$ denotes a refined measurement value for a carrier (c) of a beam pair (b), and $\beta_{b,c}$ denotes the measurement value before the refinement, for the carrier (c) of the beam pair (b).

Next, whether the performance of the primary carrier is satisfied may be determined based on Equation 2 Below:

$$\Gamma_{b,pcell} > QoS_p \quad (2)$$

In Equation 2, $\Gamma_{b,pcell}$ denotes the refined measurement value for the carrier (c) of the beam pair (b), and $QoS_p$ denotes a signal strength threshold for determining whether the performance of the primary carrier is satisfied.

If the condition of Equation 2 is not satisfied, the metric for the corresponding beam pair may be determined based on Equation 3:

$$\Omega_{b,c} = \Gamma_{b,pcell} \quad (3)$$

In Equation 3, $\Omega_{b,c}$ denotes the metric for the beam pair (b), and $\Gamma_{b,pcell}$ denotes the refined measurement value for the carrier (c) of the beam pair # b.

If the condition of Equation 2 is satisfied, the high level filtering and the low level filtering may be conducted. In so doing, a target of the high level filtering is determined based on Equation 4, and a target of the low level filtering is determined based on Equation 5.

$$\Gamma_{b,c} > \omega \quad (4)$$

In Equation 4, $\Gamma_{b,c}$ denotes the refined measurement value for the carrier (c) of the beam pair (b), and $\omega$ denotes the upper threshold.

$$\max|\Gamma_{b,c} - \Gamma_{b,c'}| > \mu \quad (5)$$

In Equation 5, $\Gamma_{b,c}$ denotes the refined measurement value for the carrier (c) of the beam pair (b), $\Gamma_{b,c'}$ denotes a refined measurement value for other carrier than the carrier (c) of the beam pair (b), and $\mu$ denotes a threshold for determining the target of the low level filtering.

In Equation 5, $\max|\Gamma_{b,c} - \Gamma_{b,c'}|$ denotes a maximum value among difference values between the measurement values for the selected carrier and the measurement values for other carrier. Accordingly, $\max|\Gamma_{b,c} - \Gamma_{b,c'}|$ may be replaced by a value that is produced by subtracting a corresponding measurement value from the maximum value among the measurement values. In this case, the equivalent determination to Equation 4 may be made by comparing the difference of the maximum value and $\mu$ with the corresponding measurement value. The difference of the maximum value and $\mu$ corresponds to the lower threshold of FIG. 12.

According to the filtering, the weight to be applied to the corresponding measurement value may be determined based on Equation 6 below:

$$w_{b,c} = \varepsilon_H$$

$$w_{b,c} = \varepsilon_L \quad (6)$$

In Equation 6, $w_{b,c}$ denotes a weight applied to the carrier (c) of the beam pair (b), $\varepsilon_H$ denotes the first weight applied in the high level filtering, and $\varepsilon_L$ denotes the second weight applied in the low level filtering.

The metric for the corresponding beam pair may be determined based on Equation 7 below:

$$\Omega_{b,c} = \Sigma \omega_{b,c} \Gamma_{b,c} \quad (7)$$

In Equation 7, $\Omega_{b,c}$ denotes the metric for the beam pair (b), $w_{b,c}$ denotes the weight applied to the carrier (c) of the beam pair (b), and $\Gamma_{b,c}$ denotes the refined measurement value for the carrier (c) of the beam pair (b).

Finally, an optimal beam pair may be selected based on Equation 8 below:

$$\arg\max \Omega_{b,c} \quad (8)$$

In Equation 8, $\Omega_{b,c}$ denotes the metric for the beam pair (b).

In the above-described various embodiments, the terminal determines the transmit beam of the base station and the receive beam of the terminal for the downlink communication. However, it is understood that one or more other embodiments are not limited thereto. For example, according to another embodiment, the transmit beam of the base station may be determined by the base station. In this case, the terminal feeds the measurement values for the beam pairs back, and the corresponding operations of the base station according to this embodiment may be as described below with reference to FIG. 13.

Figure 13:
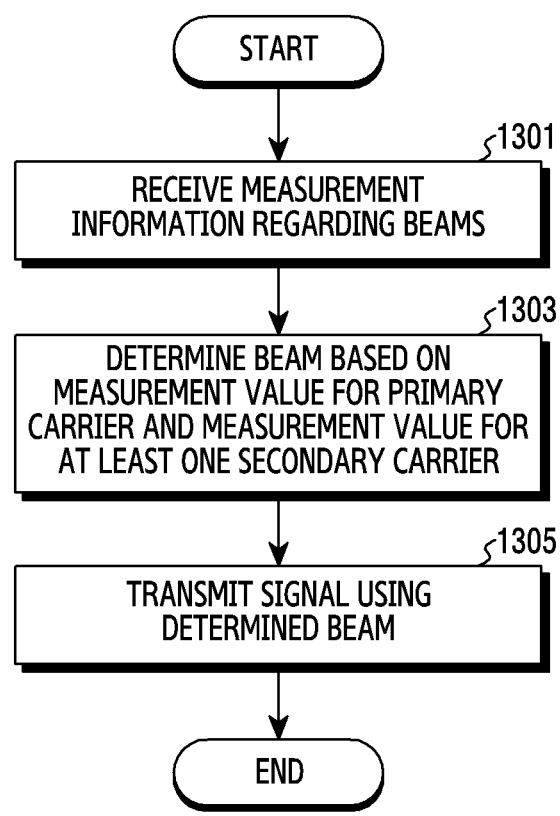
FIG. 13 illustrates a flowchart of a base station for determining a transmit beam in a wireless communication system according to an embodiment.

FIG. 13 illustrates a flowchart of a base station for determining a transmit beam in a wireless communication system according to an embodiment. For example, FIG. 13 illustrates an operating method of the base station 110.

Referring to FIG. 13, in operation 1301, the base station receives measurement information regarding beams. Herein, the measurement information includes measurement values per beam pair. The measurement values in the measurement information may be distinguished per carrier. Further, the measurement information may include information indicating an optimal beam for the entire or individual carrier.

In operation 1303, the base station determines a beam based on a measurement value for a primary carrier and a measurement value for at least one secondary carrier. That is, according to one or more embodiments, in determining the optimal beam, the secondary carrier may be further considered in addition to the primary carrier. In other words, signal strength of at least one secondary carrier may affect the beam selection result. In some cases, only the signal strength of the primary carrier may affect the beam selection result. The base station may select the beam by further considering interference between terminals.

In operation 1305, the base station transmits a signal using the determined beam. That is, the base station may select an optimal beam, and then beamform the signal transmitted to the terminal using the selected beam. In addition, the base station may notify the determined beam information to the terminal in operation 1305. Hence, the terminal may use a receive beam corresponding to the transmit beam of the base station.

In FIG. 13, the base station may select the transmit beam based on the measurement value for the primary carrier and the measurement value for at least one secondary carrier. In so doing, the base station may perform the operations according to at least one of the embodiments described with reference to FIGS. 8 through 12. That is, the base station may improve reliability by averaging the measurement values for the beam pairs. The base station may determine a metric for a corresponding beam pair, based on the measurement value for the primary carrier if the measurement value for the primary carrier is less than the threshold, or based on the measurement value for at least one secondary carrier if the measurement value for the primary carrier is greater than the threshold. In determining the metric for the corresponding beam pair based on the measurement value for at least one secondary carrier, the base station may perform at least one of the high level filtering and the low level filtering.

The aforementioned embodiments have been described with reference to downlink communication. It is understood, however, that the above-described embodiments may be carried out to select a beam for an uplink communication. In this case, the beam pair may be selected by the base station (e.g., the base station 110). For example, if the base station includes the single RF module as shown in FIG. 5 and performs the CA, the base station may perform the above-described methods to determine the beam pair for the uplink communication. In this case, the base station may operate as shown in FIG. 14.

Figure 14:
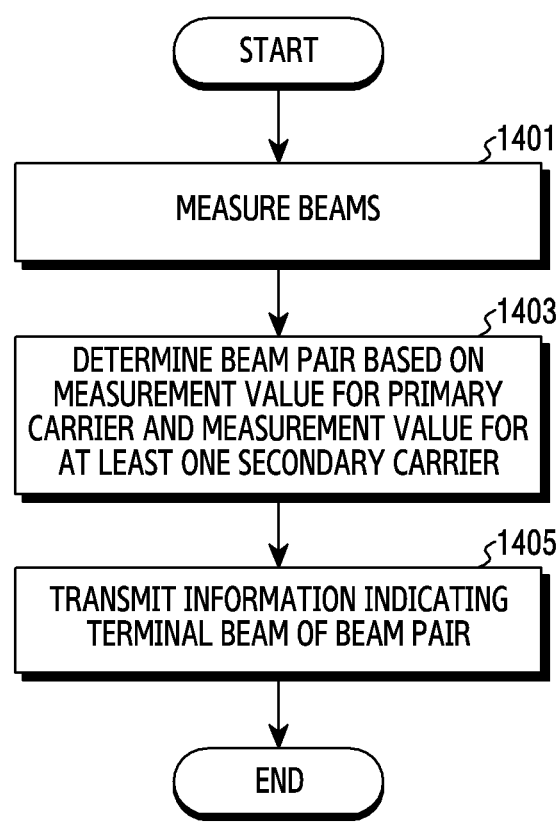
FIG. 14 illustrates a flowchart of a base station for determining a beam for uplink communication in a wireless communication system according to an embodiment.

FIG. 14 illustrates a flowchart of a base station for determining a beam for uplink communication in a wireless communication system according to an embodiment. For example, FIG. 14 illustrates an operating method of the base station 110.

Referring to FIG. 14, in operation 1401, the base station measures beams. Herein, the measurement may be conducted per beam pair. For example, the base station may perform the measurement using a reference signal (e.g., a sounding reference signal, a demodulation reference signal, etc.) transmitted from the terminal. To this end, the base station may transmit configuration information for transmitting the reference signal to the terminal.

In operation 1403, the base station determines a beam pair based on a measurement value for a primary carrier and a measurement value for at least one secondary carrier. That is, according to one or more embodiments, in determining an optimal beam pair, the secondary carrier may be further considered in addition to the primary carrier. In other words, signal strength of at least one secondary carrier may affect the beam pair selection result. In some cases, only the signal strength of the primary carrier may affect the beam pair selection result.

In operation 1405, the base station transmits information indicating a base station beam of the beam pair. That is, the base station may select the optimal beam pair, and then transmit, to the terminal, information indicating the transmit beam of the terminal belonging to the selected beam pair. In so doing, one or two or more beams may be indicated. The beam indication information may include a beam index and/or a resource index to which the reference signal transmitted using the corresponding beam is mapped.

In FIG. 14, the base station may select the beam pair based on the measurement value for the primary carrier and the measurement value for at least one secondary carrier. In so doing, the base station may perform the operations according to at least one of the embodiments described with reference to FIGS. 8 through 12. That is, the base station may improve reliability by averaging the measurement values for the beam pairs. The base station may determine a metric for a corresponding beam pair based on the measurement value for the primary carrier if the measurement value for the primary carrier is less than a threshold or based on the measurement value for at least one secondary carrier if the measurement value for the primary carrier is greater than the threshold. In determining the metric for the corresponding beam pair based on the measurement value for at least one secondary carrier, the base station may perform at least one of the high level filtering and the low level filtering.

Figure 15:
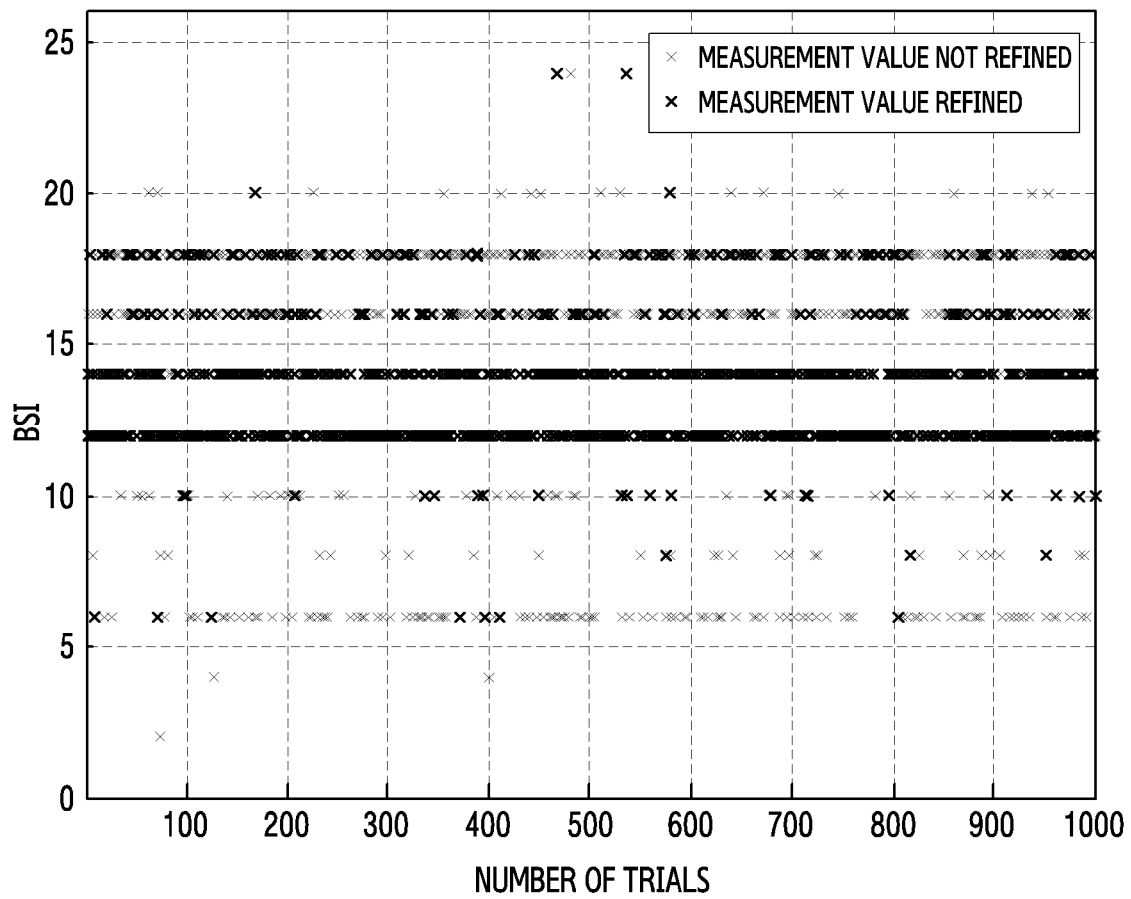
FIG. 15 illustrates beam selection results in a wireless communication system according to an embodiment.

FIG. 15 illustrates beam selection results in a wireless communication system according to an embodiment. FIG. 15 shows advantages of the measurement value refinement. If the measurement value is not refined, the beam selection frequently changes due to an estimation error of the measurement value. In this case, the scheme that considers only the primary carrier is applied. By contrast, if the measurement value is refined, stable beam selection is conducted. In this case, a scheme that considers the primary carrier and the secondary carrier is applied.

Figure 16:
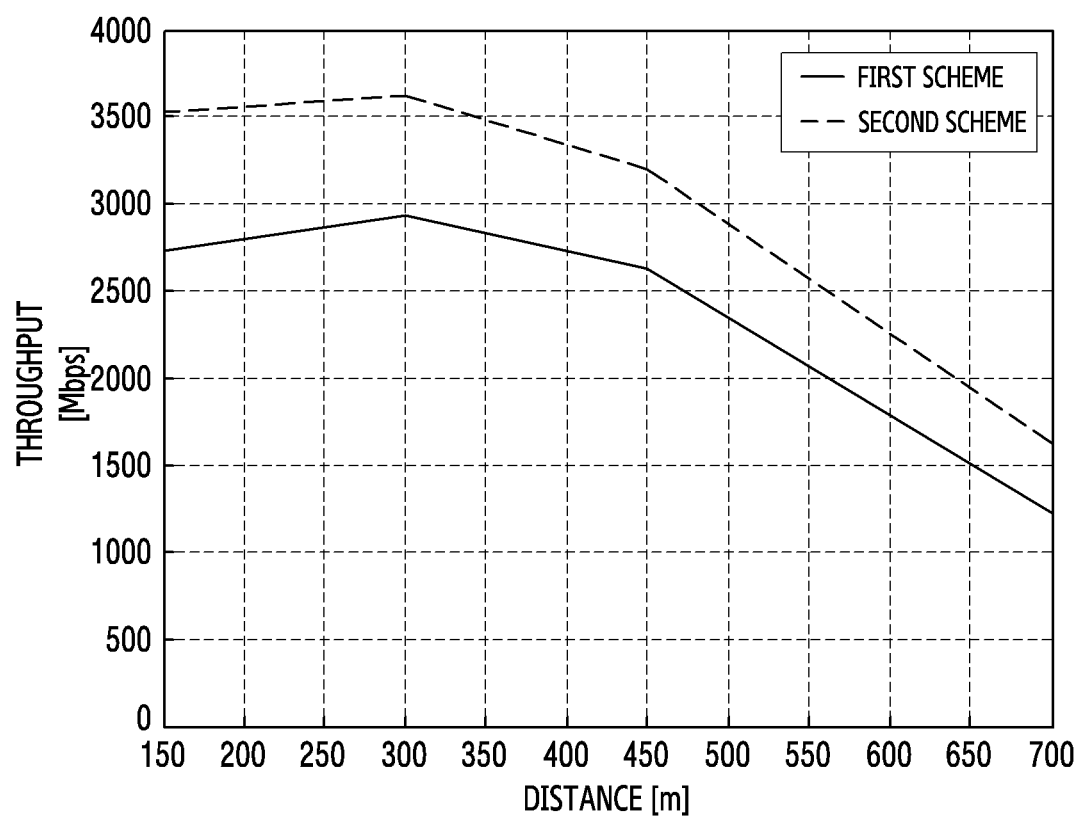
FIG. 16 illustrates data rate experiment results in a wireless communication system according to an embodiment.

FIG. 16 illustrates data rate experiment results in a wireless communication system according to an embodiment. In FIG. 16, the first scheme considers only the primary carrier, and the second scheme considers the primary carrier and the secondary carrier. The first scheme based on the primary carrier degrades the performance of the secondary carrier and thus the total data rate is decreased. However, the second scheme considering the secondary carrier effectively improves the performance by excluding unnecessary beam selection and optimizing the performance of the secondary carrier. Compared with the first scheme, the second scheme provides an improved data rate of about 10%, thereby improving the data transmission and/or reception functionality of the participating devices.

The above-described various embodiments may be applied to a system that uses a single RF module in a multi-carrier system due to, for example, limitations on space and cost. It is understood, however, that the present disclosure is not limited to the single RF module.

For example, even if a communication device (e.g., the terminal or the base station) includes a plurality of RF modules and uses only some RF modules temporarily or permanently, the beam may be selected according to one or more embodiments. According to an embodiment, the terminal or the base station may temporarily use only one RF module for power saving, and deactivate at least one other RF module. In this case, the beam selection according to one or more embodiments may be triggered based on remaining power (e.g., a remaining battery capacity, a power supply state, etc.). According to another embodiment, if some of the RF modules may not normally operate due to inspection (e.g., calibration) or failure, only some RF modules may be used. In this case, the terminal or the base station may select the beam according to one or more embodiments and communicate with each other. That is, the beam selection according to one or more embodiments may be triggered based on whether the RF modules are available.

For example, the communication device (e.g., the terminal or the base station) may include a plurality of RF modules, group the RF modules, and then use one RF module per group. For example, in the CA using eight carriers, the device may create two or more groups including four carriers or two carriers, and use one RF module per group.

As set forth above, an apparatus and a method according to various embodiments select a beam by considering the performance of not only the primary carrier, but also the secondary carrier, thereby ensuring the performance of the primary carrier and improving the performance of the secondary carrier.

It is understood that methods according to embodiments described in the claims and/or the specification of the disclosure may be implemented in software, hardware, or a combination of hardware and software.

As for software, a computer-readable storage medium storing one or more programs (e.g., software modules) may be provided. One or more programs stored in the computer-readable storage medium may be configured for execution by one or more processors of an electronic device. One or more programs may include instructions for controlling the electronic device to execute the methods according to embodiments described in the claims or the specification of the disclosure.

Such a program (e.g., software module, software, code, etc.) may be stored in a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, the program may be stored in a memory combining part or all of those recording media. A plurality of memories may be equipped or provided.

The program may be stored in an attachable storage device accessible via a communication network such as Internet, Intranet, local area network (LAN), wide LAN (WLAN), or storage area network (SAN), or a communication network by combining these networks. The storage device may access the electronic device through an external port. A separate storage device may access the device over the communication network.

While the present disclosure has been shown and described with reference to various embodiments, it will be understood by those skilled in the art that various changes in form and details may be made therein without departing from the spirit and scope of the present disclosure as defined by the appended claims and their equivalents.

What is claimed is:

1. A method for operating a first device in a wireless communication system, the method comprising:
   measuring a plurality of beam pairs using signals transmitted from a second device through a plurality of carriers as a primary carrier and at least one secondary carrier included in a carrier aggregation (CA);
   identifying a beam pair having a maximum measurement value for the primary carrier;
   based on a measurement value being less than a threshold, determining the identified beam pair as a communication beam pair; and
   transmitting, to the second device, information indicating a transmit beam of the communication beam pair,
   wherein measurement values for the plurality of beam pairs comprise measurement values for each of the plurality of beam pairs for the primary carrier of the CA and measurement values for the each of the plurality of beam pairs for the at least one secondary carrier of the CA.

2. The method of claim 1, wherein the identifying the beam pair comprises:
   determining metrics for the plurality of beam pairs, based on the measurement values for the each of the plurality of beam pairs for the primary carrier and the measurement values for the each of the plurality of beam pairs for the at least one secondary carrier; and
   determining the beam pair having a maximum metric of the determined metrics.

3. The method of claim 2, wherein the determining the metrics comprises:
   based on a measurement value for the primary carrier being less than the threshold, determining a metric for a corresponding beam pair based on the measurement value for the primary carrier; and
   based on the measurement value for the primary carrier being greater than the threshold, determining the metric for the corresponding beam pair based on a measurement value for the at least one secondary carrier.

4. The method of claim 3, wherein the determining the metric based on the measurement value for the at least one secondary carrier comprises decreasing at least one measurement value that is greater than an upper threshold.

5. The method of claim 4, wherein the at least one measurement value that is greater than the upper threshold is decreased to a predefined value.

6. The method of claim 3, wherein the determining the metric based on the measurement value for the at least one secondary carrier comprises decreasing at least one measurement value that is less than a lower threshold.

7. The method of claim 6, wherein the lower threshold is defined based on a maximum value among carrier measurement values per carrier for the corresponding beam pair.

8. The method of claim 6, wherein the at least one measurement value that is less than the lower threshold is decreased to a predefined value.

9. The method of claim 1, further comprising averaging measurement values for a same beam pair.

10. An apparatus for a first device that performs communication in a wireless communication system, the apparatus comprising:
 a transceiver configured to transmit and receive signals; and
 at least one processor coupled to the transceiver and configured to:
  measure a plurality of beam pairs using signals transmitted from a second device through a plurality of carriers as a primary carrier and at least one secondary carrier included in a carrier aggregation (CA);
  identify a beam pair having a maximum measurement value for the primary carrier; and
  based on a measurement value being less than a threshold, determine the identified beam pair as a communication beam pair; and
  control to transmit, to the second device, information indicating a transmit beam of the communication beam pair;
 wherein measurement values for the plurality of beam pairs comprise measurement values for each of the plurality of beam pairs for the primary carrier of the CA and measurement values for the each of the plurality of beam pairs for the at least one secondary carrier of the CA.

11. The apparatus of claim 10, wherein the at least one processor is further configured to:
 determine metrics for the plurality of beam pairs, based on the measurement values for the each of the plurality of beam pairs of the primary carrier and the measurement values for the each of the plurality of beam pairs of the at least one secondary carrier; and
 determine the beam pair having a maximum metric of the determined metrics.

12. The apparatus of claim 11, wherein the at least one processor is further configured to:
 based on a measurement value for the primary carrier being less than the threshold, determine a metric for a corresponding beam pair based on the measurement value for the primary carrier, and
 based on the measurement value for the primary carrier being greater than the threshold, determine the metric for the corresponding beam pair based on a measurement value for the at least one secondary carrier.

13. The apparatus of claim 12, wherein the at least one processor is further configured to decrease at least one measurement value that is greater than an upper threshold.

14. The apparatus of claim 13, wherein the at least one measurement value that is greater than the upper threshold is decreased to a predefined value.

15. The apparatus of claim 12, wherein the at least one processor is further configured to decrease at least one measurement value that is less than a lower threshold.

16. The apparatus of claim 15, wherein the lower threshold is defined based on a maximum value among carrier measurements per carrier values for the corresponding beam pair.

17. The apparatus of claim 15, wherein the at least one measurement value that is less than the lower threshold is decreased to a predefined value.

18. The apparatus of claim 10, wherein the at least one processor is further configured to average measurement values for a same beam pair.

* * * * *